United States Patent
Chen

(10) Patent No.: US 9,126,275 B2
(45) Date of Patent: Sep. 8, 2015

(54) CIRCULAR SAW

(71) Applicant: Rexon Industrial Corp., Ltd., Taichung (TW)

(72) Inventor: Jung-Huo Chen, Taichung (TW)

(73) Assignee: REXON INDUSTRIAL CORP., LTD., Taichung (TW)

( * ) Notice: Subject to any disclaimer, the term of this patent is extended or adjusted under 35 U.S.C. 154(b) by 270 days.

(21) Appl. No.: 13/866,347

(22) Filed: Apr. 19, 2013

(65) Prior Publication Data

US 2013/0276608 A1    Oct. 24, 2013

Related U.S. Application Data

(60) Provisional application No. 61/635,990, filed on Apr. 20, 2012.

(30) Foreign Application Priority Data

Apr. 20, 2012 (TW) .............................. 101114193 A

(51) Int. Cl.
*B23D 45/04* (2006.01)
*B27G 19/02* (2006.01)

(52) U.S. Cl.
CPC .............. *B23D 45/046* (2013.01); *B27G 19/02* (2013.01); *Y10T 83/7693* (2015.04)

(58) Field of Classification Search
CPC .... B27G 19/02; B23D 45/046; B23D 47/025; B23D 45/025; B23D 47/02; B23D 45/048
USPC .......... 83/471.2, 471.3, 581, 485, 491, 486.1, 83/490, 486, 487, 488, 489, 473, 477, 859, 83/397; 144/285
See application file for complete search history.

(56) References Cited

U.S. PATENT DOCUMENTS

| | | | |
|---|---|---|---|
| 5,241,888 A | 9/1993 | Chen | |
| 2007/0163409 A1 | 7/2007 | Nishikawa et al. | |
| 2009/0031875 A1* | 2/2009 | Ushiwata et al. | 83/471.3 |
| 2010/0275755 A1* | 11/2010 | Cox | 83/471.3 |
| 2012/0118121 A1* | 5/2012 | Xu et al. | 83/471.3 |
| 2013/0133495 A1* | 5/2013 | Imamura et al. | 83/471.3 |

* cited by examiner

*Primary Examiner* — Ghassem Alie
(74) *Attorney, Agent, or Firm* — Bacon & Thomas, PLLC

(57) ABSTRACT

A circular saw includes a machine base, a sliding unit having a slide shaft slidably inserted through the machine base and a stationary mount fixedly mounted at one end of the slide shaft and defining a datum plane, and a cutting unit having a supporting arm pivotally connected to the stationary mount and a saw blade pivotally connected to the supporting arm. The saw blade is movable by the supporting arm up and down relative to the machine base between a lower limit position and an upper limit position so that the saw blade may intersect with the datum plane or be kept in a tangential relationship relative to the datum plane when it reaches the lower limit position. Thus, the circular saw has a compact size, low vibration level and high precision characteristics.

17 Claims, 4 Drawing Sheets

CIRCULAR SAW

CROSS REFERENCE TO RELATED APPLICATION(S)

This application claims, under 35 U.S.C. §119(e), priority to U.S. Provisional Application No. 61/635,990, filed Apr. 20, 2012, which application is hereby incorporated by reference in its entirety, inclusive of the specification, claims, and drawings.

FIELD OF THE INVENTION

The present invention relates to the field of saw machines, and more particularly to a circular saw having a compact size, low vibration level and high precision characteristics.

BACKGROUND

Both U.S. Pat. No. 5,241,888 and U.S. Application Publication Number 2007/0163409 disclose a slidable miter saw. However, the saws disclosed in these two prior art designs exhibit certain drawbacks, such as bulk size and high operating vibration, which affect the cutting precision. Specifically, according to the aforesaid two prior art saws, the cutting unit must be kept within a limited cutting stroke, and the length of the sliding stroke of the slide bars of the sliding mechanism must be fixed. Further, the supporting arm that extends from the front side of the sliding mechanism must be properly defined.

If the length of the supporting arm that extends from the front side of the sliding mechanism is excessively long, the size of the worktable must be relatively increased to fit the stroke of the cutting unit and to give sufficient support to the workpiece. However, increasing the size of the worktable relatively increases the storage and delivery cost of the miter saw. According to the aforesaid prior art saws, the length of the arm of force of the cutting unit is determined subject to the extending distance of the sliding mechanism. In order to increase the arm of force of the cutting unit, the extending distance of the sliding mechanism cannot be reduced, thus resulting in a high level of operating vibration that correspondingly affects the precision of the cutting operation.

SUMMARY OF THE INVENTION

The present invention has been accomplished under the circumstances in view. It is therefore the main object of the present invention to provide a circular saw, which has the characteristics of compact size, low operating vibration and high cutting precision.

To achieve this and other objects of the present invention, a circular saw comprises a machine base, a sliding unit, and a cutting unit. The sliding unit comprises at least one slide shaft and a stationary mount. The slide shaft is axially movably inserted through the machine base. The stationary mount comprises a mounting portion affixed to one end of the slide shaft for enabling the stationary mount to be moved by the slide shaft relative to the machine base. The cutting unit comprises a supporting arm pivotally connected to the stationary mount, and a saw blade pivotally connected to the supporting arm. Thus, the saw blade is movable by the supporting arm relative to the machine base between an upper limit position and a lower limit position.

Further, the mounting portion of the stationary mount of the sliding unit has a front side facing toward the saw blade and defining a datum plane. When the saw blade reaches the lower limit position, the saw blade and the datum plane intersect with each other, or alternatively may be kept in a tangential relationship. Thus, the circular saw advantageously has compact size, low vibration level and high precision characteristics.

It is another object of the present invention to provide a circular saw which enhances the operating smoothness. To achieve this and other objects of the present invention, the circular saw further comprises a guard mechanism. The guard mechanism comprises a saw blade guard and a link. The saw blade guard is pivotally connected to the supporting arm to surround the saw blade. The stationary mount defines a guide groove and a bearing groove. The link has its one end pivotally connected to the saw blade guard, and its other end providing a protruded guide portion and a protruded bearing portion. The protruded guide portion is coupled to and movable along the guide groove. The protruded bearing portion is coupled to and movable along the bearing groove. When the saw blade is biased from the upper limit position to the lower limit position, the saw blade guard will correspondingly be biased by the link relative to the saw blade to expose the saw blade, thus achieving enhanced operating smoothness.

BRIEF DESCRIPTION OF THE DRAWINGS

These and other advantages and features of the present invention will be understood by reference to the following specification in conjunction with the accompanying drawings, in which like reference characters denote like elements of structure.

Figure 1:
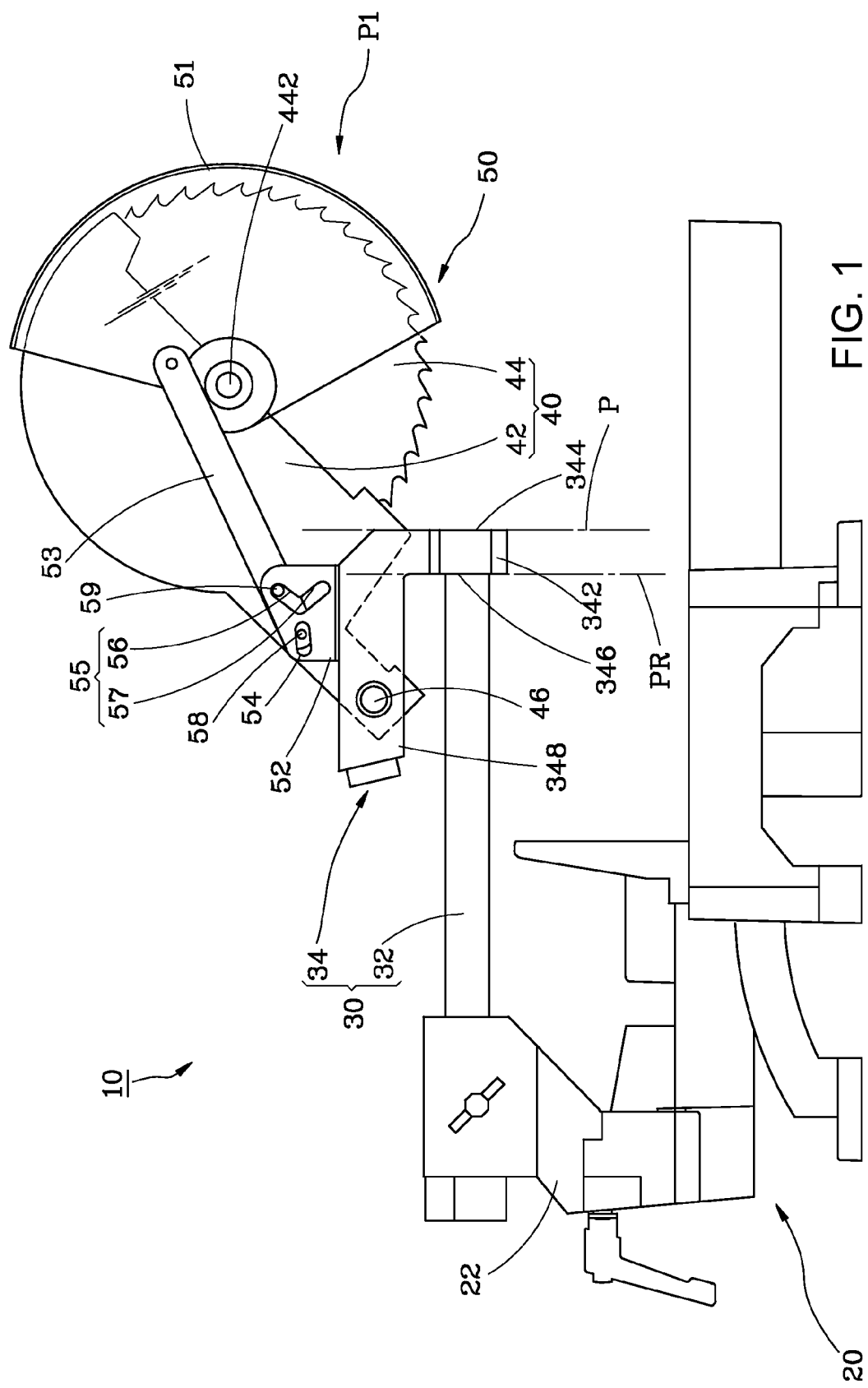
FIG. 1 is an elevational view illustrating a saw blade of a circular saw kept in an upper limit position in accordance with the present invention.

It should be noted that the drawing figures are not necessarily drawn to scale, but instead are drawn to provide a better understanding of the components thereof, and are not intended to be limiting in scope, but rather to provide exemplary illustrations. It should further be noted that the figures illustrate exemplary embodiments of a circular saw and the components thereof, and in no way limit the structures or configurations of a circular saw and components thereof according to the present disclosure.

DETAILED DESCRIPTION

While the disclosure may be susceptible to various modifications and alternative constructions, certain illustrative embodiments are shown in the drawings and are described in detail below. It should be understood, however, that there is no intention to limit the disclosure to the specific embodiments disclosed, but on the contrary, the intention is to cover all modifications, alternative constructions, combinations, and equivalents falling within the spirit and scope of the disclosure.

It will be understood that, unless a term is expressly defined in this disclosure to possess a described meaning, there is no intent to limit the meaning of such term, either expressly or indirectly, beyond its plain or ordinary meaning.

Referring to FIG. 1, a circular saw in accordance with the present invention is shown. As illustrated, the circular saw 10 comprises a machine base 20, a sliding unit 30, a cutting unit 40, and a guard mechanism 50. The machine base 20 is mounted at a tabletop or any other support surface means for holding the workpiece to be cut, and comprises a bracket 22 upwardly extended from a rear side thereof.

The sliding unit 30 comprises at least one slide shaft 32 and a stationary mount 34. The slide shaft 32 is axially slidably inserted through the bracket 22, enabling the sliding unit 30 to be moved linearly relative to the bracket 22 along a predetermined traveling path to achieve a predetermined cutting stroke. The stationary mount 34 comprises a mounting portion 342 and an extension portion 348. The mounting portion 342 of the stationary mount 34 is affixed to one end of the slide shaft 32, thus enabling the stationary mount 34 to be moved by the slide shaft 32 relative to the machine base 20. Further, the mounting portion 342 of the stationary mount 34 has a front side 344 and a rear side 346. The front side 344 of the stationary mount 34 defines a datum plane P remotely located from the slide shaft 32. This datum plane P is substantially perpendicular to the axial direction of the slide shaft 32. The rear side 346 of the mounting portion 342 defines a rear plane PR located adjacent to the slide shaft 32. This rear plane PR is substantially parallel to the datum plane P. The extension portion 348 extends from the mounting portion 342 in a direction away from the rear side 346 of the mounting portion 342 and along the axial direction of the slide shaft 32.

The cutting unit 40 comprises a supporting arm 42 and a saw blade 44. The supporting arm 42 is pivotally coupled to the extension portion 348 of the stationary mount 34 by a rotating shaft 46 at a rear side relative to the rear plane PR of the mounting portion 342. The saw blade 44 has a radius R, and is pivotally connected to the supporting arm 42 by a pivot axle 442. Thus, the saw blade 44 can be moved by the supporting arm 42 up and down relative to the datum plane P of the stationary mount 34 between an upper limit position P1 and a lower limit position P2. Further, the saw blade 44 and the stationary mount 34 are arranged relative to each other in order to avoid interfering with each other. When the saw blade 44 reaches the upper limit position P1, as shown in FIG. 1, the saw blade 44 and the datum plane P intersect.

Figure 3:
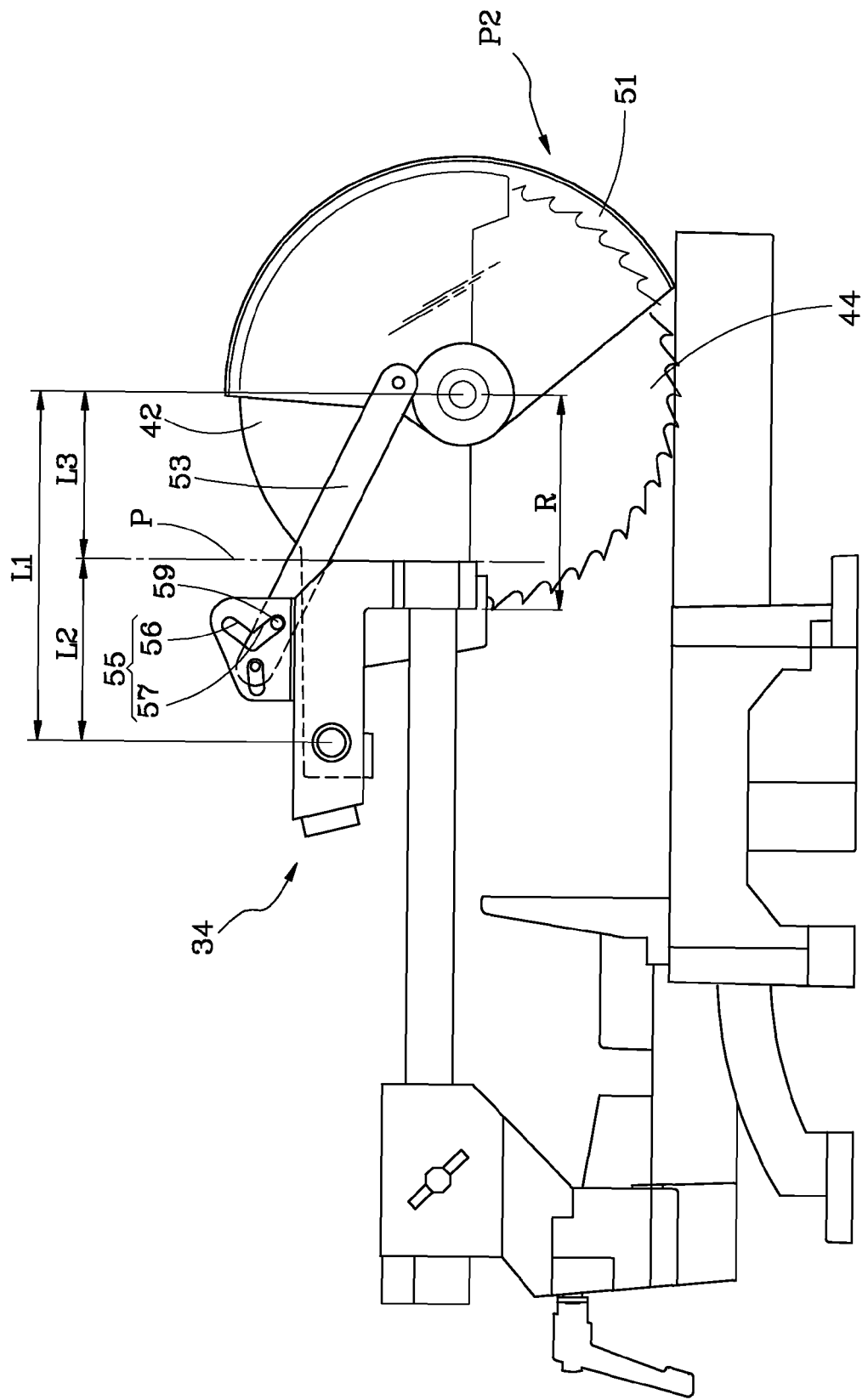
FIG. 3 is an elevational view of the circular saw of FIG. 1, illustrating the saw blade of the circular saw biased from the upper limit position to a lower limit position.

Similarly, when the saw blade 44 reaches the lower limit position P2, as shown in FIG. 3, the saw blade 44 and the datum plane P intersect. At this time, a horizontal distance L1 is defined between the pivot axle 422 and the rotating shaft 46, a horizontal distance L2 is defined between the rotating shaft 46 and the datum plane P, and a horizontal distance L3 is defined between the datum plane P and the pivot axle 442. These three horizontal distances L1, L2, L3 exhibit a relationship wherein L3=L1-L2, i.e., the horizontal distance L3 between the datum plane P and the pivot axle 442 is equal to the horizontal distance L1 between the pivot axle 442 and the rotating shaft 46 minus the horizontal distance L2 between the rotating shaft 46 and the datum plane P. Thus, the horizontal distance L3 is smaller than the radius R of the saw blade 44. Alternatively, it should be appreciated that the horizontal distance L3 may be defined to be equal to the radius R of the saw blade 44. In this alternative case, the saw blade 44 and the datum plane P have a tangential relationship.

The guard mechanism 50 comprises a saw blade guard 51, a support 52, and a link 53. The saw blade guard 51 is pivotally connected to the supporting arm 42 to surround the saw blade 44. The support 52 is mounted at the top side of the stationary mount 34, defining a guide groove 54 and a bearing groove 55. The bearing groove 55 is an elongated groove having a first sloping segment 56 and a second sloping segment 57. The first sloping segment 56 slopes downwardly from a location close to the datum plane P to a location far from the datum plane P. The second sloping segment 57 is kept in communication with the first sloping segment 56. Further, the second sloping segment 57 obliquely extends downwardly from the bottom end of the first sloping segment 56 in the direction toward the datum plane P. The link 53 has one end thereof pivotally connected to the saw blade guard 51. An opposite second end of the link 53 is provided with a protruded guide portion 58 and a protruded bearing portion 59. Both the protruded guide portion 58 and the protruded bearing portion 59 protrude from one side of the opposite second end of the link 53. Moreover, the protruded guide portion 58 is slidably coupled to the guide groove 54, and the protruded bearing portion 59 is slidably coupled to the bearing groove 55.

Figure 2:
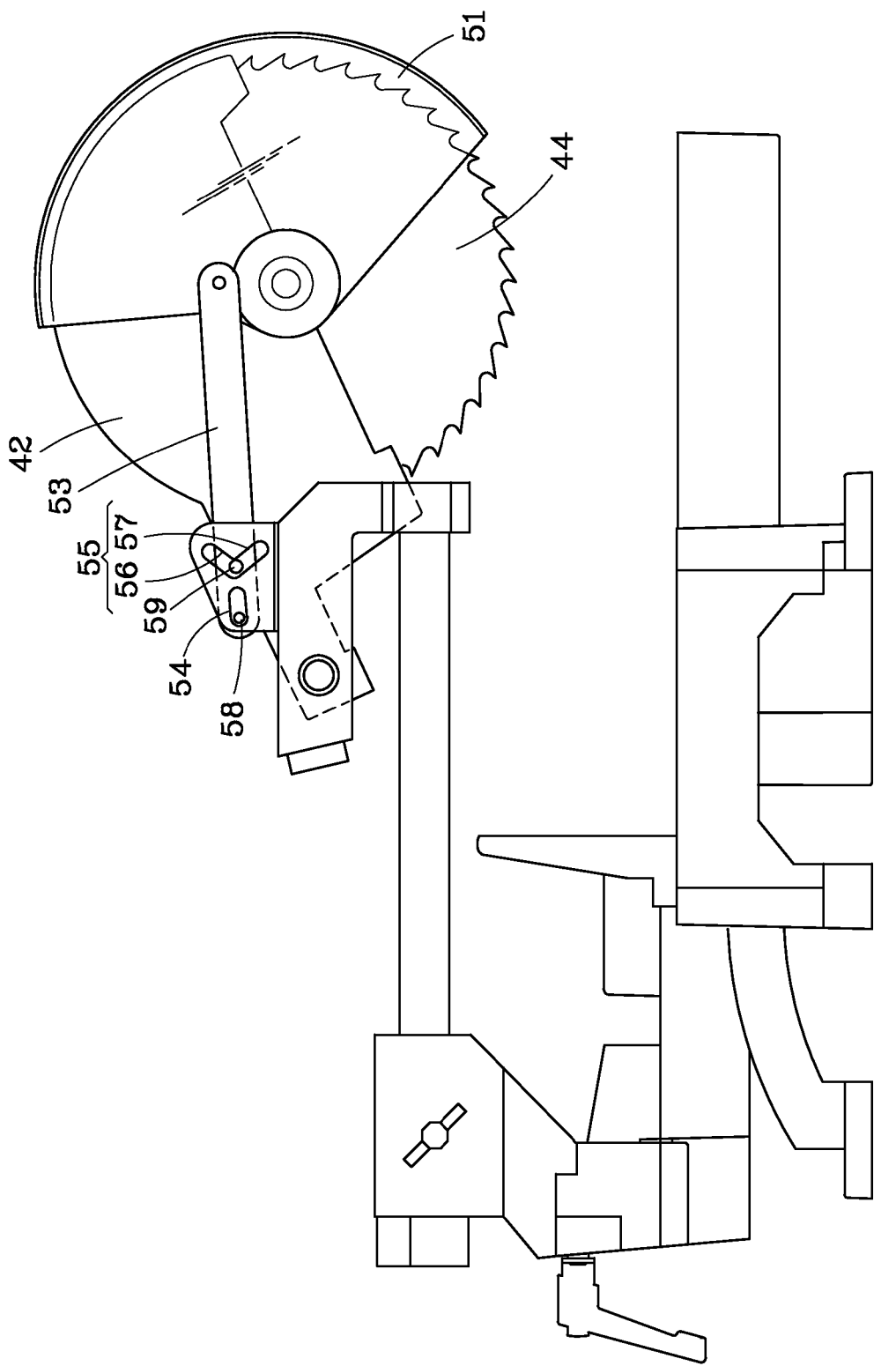
FIG. 2 is an elevational view of the circular saw of FIG. 1, illustrating the saw blade of the circular saw biased from the upper limit position to an intermediate position.

Referring again to FIG. 1, the saw blade 44 is kept in the upper limit position P1 before application. At this time, the protruded bearing portion 59 of the link 53 is positioned in the top end of the first sloping segment 56 of the bearing groove 55. When using the saw machine, the supporting arm 42 is biased downwardly toward the machine base 20 to move the saw blade 44 from the upper limit position P1 toward the lower limit position P2, as shown in FIG. 3. This movement forces the protruded bearing portion 59 of the link 53 to move downwardly along the first sloping segment 56 of the bearing groove 55, and the protruded guide portion 58 of the link 53 to move backwardly along the guide groove 54, as shown in FIG. 2. Additionally, the resisting force produced between the protruded bearing portion 59 of the link 53 and the first sloping segment 56 of the bearing groove 55 at this time is imparted to the saw blade guard 51 to bias the saw blade guard 51 relative to the saw blade 44, thus increasing the exposed part of the saw blade 44.

Figure 4:
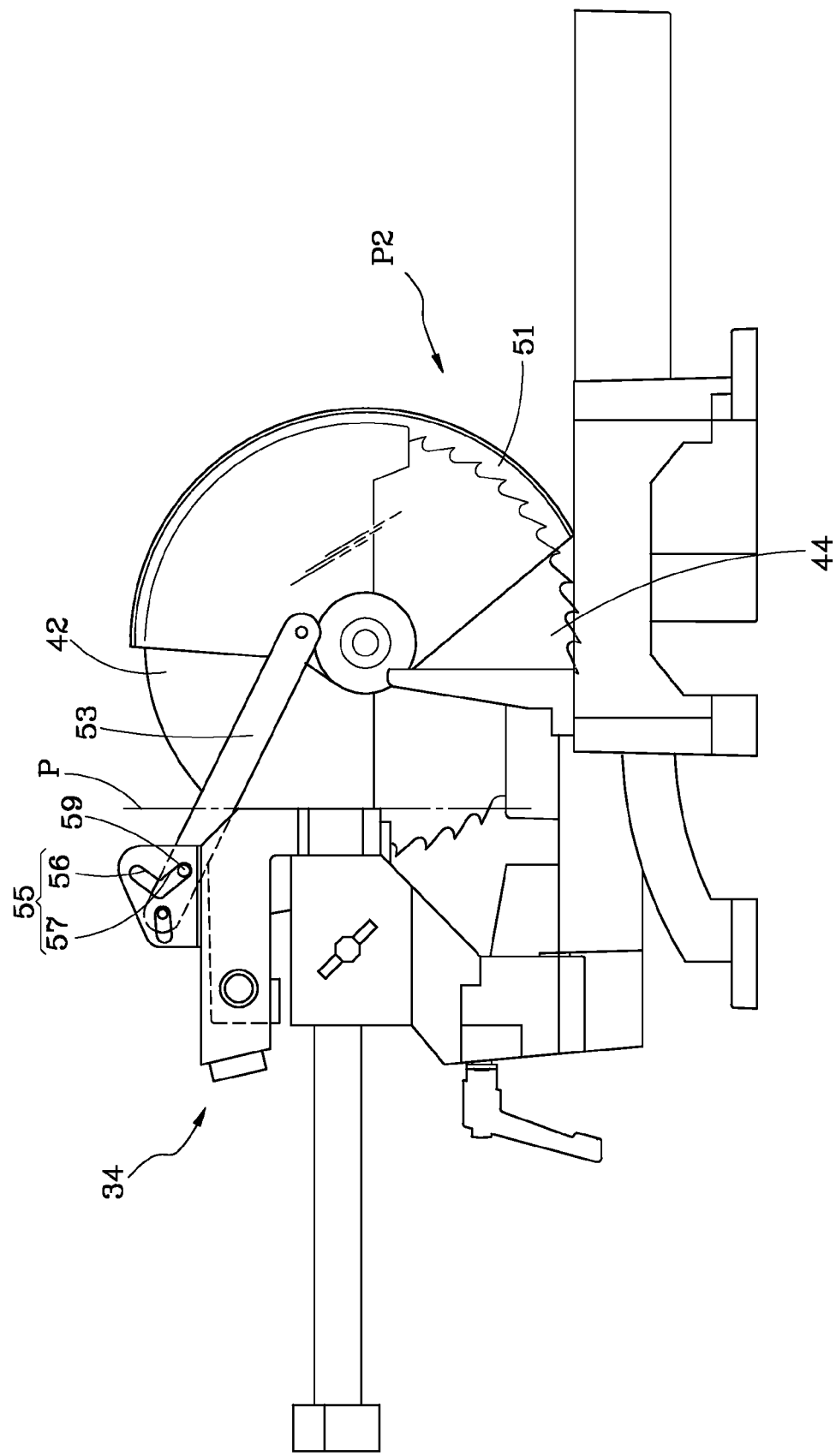
FIG. 4 is an elevational view of the circular saw of FIG. 1, illustrating the cutting unit moved relative to the worktable.

By continuously biasing the supporting arm 42 downward, the protruded bearing portion 59 of the link 53 will be moved downwardly along the second sloping segment 57 of the bearing groove 55 and kept stopped against the second sloping segment 57 of the bearing groove 55, as shown in FIG. 3. This enables the link 53 to keep biasing the saw blade guard 51 relative to the saw blade 44, and therefore continuously increase the exposed area of the saw blade 44. When the protruded bearing portion 59 of the link 53 reaches the bottom end of the second sloping segment 57 of the bearing groove 55, the saw blade 44 intersects with the datum plane P of the stationary mount 34, as shown in FIG. 3. At this time, the cutting unit 40 can be moved relative to the machine base 20 by the slide shaft 32. When the cutting unit 40 reaches the rear limit position during its cutting stroke, the rear side 346 of the mounting portion 342 of the stationary mount 34 is substantially rested on the bracket 22 of the machine base 20, as shown in FIG. 4. During this movement, the exposed part of the saw blade 44 is forced to cut the workpiece.

The design of the circular saw 10 in accordance with the present invention greatly shortens the distance in which the cutting unit 40 extends out of the sliding unit 30 during its cutting stroke, thus enabling the total dimensions of the circular saw to be effectively reduced. Further, shortening the arm of force can reduce the operating vibration to enhance the cutting precision. Also, the link 53 of the circular saw 10 in accordance with the present invention provides a protruded guide portion 58 and a protruded bearing portion 59 that smoothly match with the guide groove 54 and the bearing groove 55, respectively, for enabling the saw blade guard 51 to be biased smoothly relative to the support 52.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A circular saw, comprising:
a machine base;
a sliding unit comprising a slide shaft and a stationary mount, said slide shaft being axially inserted through said machine base, said stationary mount comprising a mounting portion fixedly mounted at one end of said slide shaft for enabling said stationary mount to be driven by said slide shaft to move relative to said machine base, said mounting portion of said stationary mount comprising a front side remote from said sliding shaft, said front side defining a datum plane; and
a cutting unit comprising a supporting arm and a saw blade, said supporting arm being pivotally connected to said stationary mount, said saw blade being pivotally connected to said supporting arm and movable by said supporting arm up and down relative to said datum plane between an upper limit position and a lower limit position, said saw blade intersecting with said datum plane or kept in a tangential relationship relative to said datum plane when said saw blade reaches said lower limit position;
said datum plane extending substantially perpendicular to an extending direction of said slide shaft;
wherein said mounting portion of said stationary mount comprises a rear side opposite to said front side, said rear side defining a rear plane adjacent to said slide shaft, and said rear plane extending substantially parallel to said datum plane; and
wherein said stationary mount of said sliding unit comprises an extension portion extending away from said mounting portion in a direction along the extending direction of said slide shaft and away from said rear side.

2. The circular saw as claimed in claim 1, wherein said supporting arm is pivotally connected to said extension portion of said stationary mount by a rotating shaft, said rotating shaft being located at a rear side relative to said rear plane.

3. The circular saw as claimed in claim 2, wherein said saw blade comprises a radius R and is pivotally connected to said supporting arm by a pivot axle, said pivot axle and said rotating shaft defining therebetween a first horizontal distance L1, said rotating shaft and said datum plane defining therebetween a second horizontal distance L2, said datum plane and said pivot axle defining therebetween a third horizontal distance L3, and wherein said first horizontal distance L1, said second horizontal distance L2 and said third horizontal distance L3 exhibit a relationship of L3=L1−L2, and L3≤R.

4. A circular saw, comprising:
a machine base;
a sliding unit comprising a slide shaft and a stationary mount, said slide shaft being axially inserted through said machine base, said stationary mount comprising a mounting portion fixedly mounted at one end of said slide shaft for enabling said stationary mount to be driven by said slide shaft to move relative to said machine base, said mounting portion of said stationary mount comprising a front side remote from said sliding shaft, said front side defining a datum plane;
a cutting unit comprising a supporting arm and a saw blade, said supporting arm being pivotally connected to said stationary mount, said saw blade being pivotally connected to said supporting arm and movable by said supporting arm up and down relative to said datum plane between an upper limit position and a lower limit position, said saw blade intersecting with said datum plane or kept in a tangential relationship relative to said datum plane when said saw blade reaches said lower limit position; and
a guard mechanism, said guard mechanism comprising a saw blade guard, a support and a link, said saw blade guard being pivotally connected to said supporting arm to surround said saw blade, said support being mounted at a top side of said stationary mount and defining a guide groove and a bearing groove, said link having a first end thereof pivotally connected to said saw blade guard and an opposite second end thereof comprising a protruded guide portion and a protruded bearing portion.

5. The circular saw as claimed in claim 4, wherein said protruded guide portion and said protruded bearing portion are coupled to and movable along said guide groove and said bearing groove, respectively, so that said saw blade guard is biasable by said link relative to said saw blade to expose said saw blade when biased from said upper limit position toward said lower limit position.

6. The circular saw as claimed in claim 5, wherein said protruded guide portion and said protruded bearing portion both integrally protrude from one side of the second end of said link.

7. The circular saw as claimed in claim 4, said bearing groove defining a first sloping segment and a second sloping segment, said first sloping segment sloping downwardly away from said datum plane, and said second sloping segment extending obliquely downwardly from a bottom end of said first sloping segment in a direction toward said datum plane.

8. The circular saw as claimed in claim 7, wherein said protruded bearing portion of said link reaches a top end of said first sloping segment of said bearing groove when said saw blade is in said upper limit position, and said protruded bearing portion of said link reaches a bottom end of said second sloping segment of said bearing groove when said saw blade is in said lower limit position.

9. A cutting apparatus, comprising:
a machine base;
a sliding unit comprising a slide shaft and a stationary mount, said slide shaft being axially inserted through said machine base, said stationary mount comprising a mounting portion fixedly mounted at one end of said slide shaft for enabling said stationary mount to be driven by said slide shaft to move relative to said machine base, said mounting portion of said stationary mount comprising a front side remote from said sliding shaft, said front side defining a datum plane extending substantially perpendicular to an extending direction of said slide shaft;
a cutting unit comprising a supporting arm and a circular saw blade, said supporting arm being pivotally connected to said stationary mount, said saw blade being pivotally connected to said supporting arm and movable by said supporting arm up and down relative to said datum plane between an upper limit position and a lower limit position, wherein said saw blade intersects with or tangentially touches said datum plane when said saw blade reaches said lower limit position; and
a guard mechanism comprising a saw blade guard, a support and a link, said saw blade guard being pivotally connected to said supporting arm to surround said saw blade, and said support being mounted at a top side of said stationary mount and defining a guide groove and a bearing groove.

10. The cutting apparatus as claimed in claim 9, said link having a first end thereof pivotally connected to said saw blade guard, and an opposite second end thereof having a protruded guide portion and a protruded bearing portion respectively coupled to and movable along said guide groove and said bearing groove such that said link biases said saw blade guard to expose said saw blade when moved from said upper limit position toward said lower limit position.

11. The cutting apparatus as claimed in claim 10, wherein said mounting portion of said stationary mount comprises a rear side opposite to said front side, said rear side defining a rear plane adjacent to said slide shaft, and said rear plane extending substantially parallel to said datum plane.

12. The cutting apparatus as claimed in claim 11, wherein said stationary mount of said sliding unit comprises an extension portion extending away from said mounting portion in a direction along the extending direction of said slide shaft and away from said rear side, and said supporting arm is pivotally connected to said extension portion of said stationary mount by a rotating shaft located at a rear side relative to said rear plane, and wherein said saw blade is pivotally connected to said supporting arm by a pivot axis.

13. The cutting apparatus as claimed in claim 12, wherein said pivot axle and said rotating shaft define a first horizontal distance therebetween, said rotating shaft and said datum plane define a second horizontal distance therebetween, and said datum plane and said pivot axle define a third horizontal distance therebetween, such that said third horizontal distance equals the difference between the first and second horizontal distances.

14. A circular saw, comprising:
a machine base;
a sliding unit comprising a slide shaft and a stationary mount, said slide shaft being axially inserted through said machine base, said stationary mount comprising a mounting portion fixedly mounted at one end of said slide shaft for enabling said stationary mount to be driven by said slide shaft to move relative to said machine base, said mounting portion of said stationary mount comprising a front side remote from said sliding shaft, said front side defining a datum plane;
a cutting unit comprising a supporting arm and a saw blade, said supporting arm being pivotally connected to said stationary mount, said saw blade being pivotally connected to said supporting arm and movable by said supporting arm up and down relative to said datum plane between an upper limit position and a lower limit position;
a guard mechanism comprising a saw blade guard, a support and a link, said saw blade guard being pivotally connected to said supporting arm to surround said saw blade, said support being mounted at a top side of said stationary mount and defining a guide groove and a bearing groove, said link having a first end thereof pivotally connected to said saw blade guard and an opposite second end thereof providing a protruded guide portion and a protruded bearing portion; and
wherein said bearing groove defines a first sloping segment and a second sloping segment, said first sloping segment sloping downwardly away from said datum plane, and said second sloping segment extending obliquely downwardly from a bottom end of said first sloping segment in a direction toward said datum plane.

15. The circular saw as claimed in claim 14, wherein said protruded bearing portion of said link reaches a top end of said first sloping segment of said bearing groove when said saw blade is in said upper limit position, and said protruded bearing portion of said link reaches a bottom end of said second sloping segment of said bearing groove when said saw blade is in said lower limit position.

16. The circular saw as claimed in claim 15, wherein said protruded guide portion and said protruded bearing portion are coupled to and movable along said guide groove and said bearing groove, respectively, such that moving said saw blade from said upper limit position toward said lower limit position causes said link to correspondingly urge said saw blade guard to expose said saw blade for cutting.

17. The circular saw as claimed in claim 14, wherein said mounting portion of said stationary mount comprises a rear side opposite to said front side, and wherein said stationary mount of said sliding unit comprises an extension portion extending away from said mounting portion in a direction along the extending direction of said slide shaft and away from said rear side, and wherein said supporting arm being pivotally connected to said stationary mount at a rotating shaft, and said saw blade being connected to said supporting arm at a pivot axle, and said pivot axle being on the opposite side of said mounting portion from said rotating shaft.

\* \* \* \* \*